G. W. GORDON.
HORSE-POWER.

No. 170,252.  Patented Nov. 23, 1875.

WITNESSES:
E. Wolff
O. Sedgwick

INVENTOR:
G. W. Gordon
BY
Munn & Co.
ATTORNEYS.

UNITED STATES PATENT OFFICE.

GEORGE W. GORDON, OF BEVERLY, OHIO.

IMPROVEMENT IN HORSE-POWERS.

Specification forming part of Letters Patent No. 170,252, dated November 23, 1875; application filed April 11, 1874.

*To all whom it may concern:*

Be it known that I, GEORGE W. GORDON, of Beverly, in the county of Washington and State of Ohio, have invented a new and Improved Horse-Power, of which the following is a specification:

The improvement relates to the construction of a winding-drum with teeth or projections, in combination with a lever and rod for adjusting the drum to bring it into or out of engagement with an arm or arms projecting from the rotary shaft to which the sweep is attached, as hereinafter described.

Figure 1:
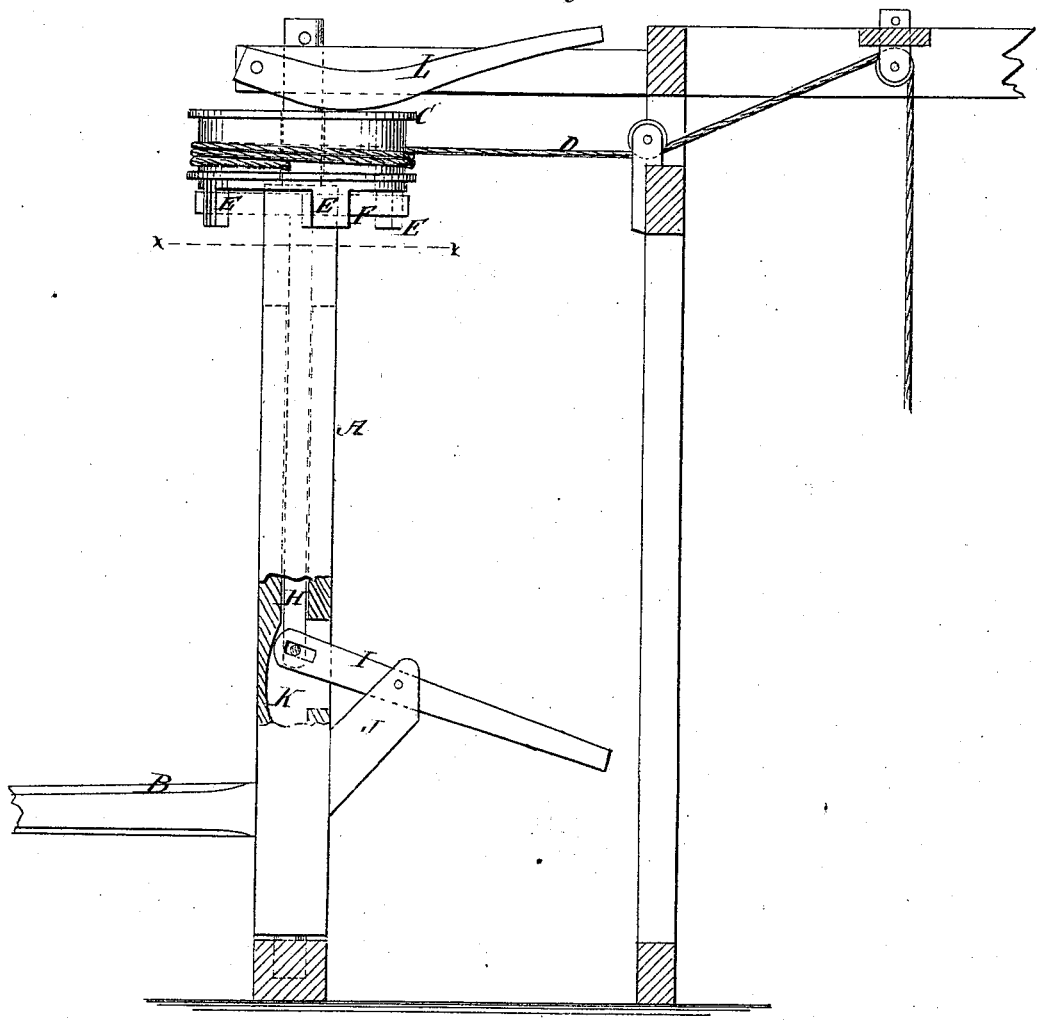
Figure 2:
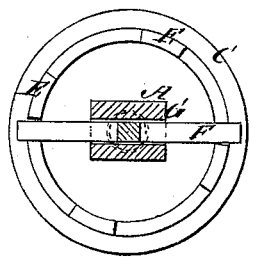

Figure 1 is a sectional elevation of my improved horse-power. Fig. 2 is a horizontal section on the line $x\,x$ of Fig. 1.

Similar letters of reference indicate corresponding parts.

A is the upright shaft, B the sweep, and C is the drum, of the horse-power for working the hoisting-rope D for elevating hay into barns, and the like. The drum is fitted loosely on the shaft, and has lugs E projecting from the lower side at the periphery, with which is a bar, F, traversing the shaft in a slot, G, and attached to the vertical rod H, in the hollow axis of the shaft, to engage said lugs, and thereby clutch the drum to the shaft when it is wanted to wind up the rope. To let the rope down again the bar F is moved down below the lugs to release the drum. For working the bar the lower end of the rod H is connected to a lever, I, pivoted to a bracket, J, on the lower part of the shaft, and extending into the shaft at a mortise, K.

The advantage of this arrangement is that the horse can be constantly traveling, so as to avoid the delay and the labor of stopping and starting, which are incident to the use of the apparatus ordinarily employed—that is to say, the rotation of the shaft A is continuous, and when any weight or object is being hoisted the drum is allowed to remain locked with the shaft by means of lugs E and arm F, so that the rope D will be wound up on the drum. When it is desired to arrest the hoisting the lever I is depressed, thus drawing the bar F downward in the slot formed in said shaft, and disengaging it from lugs E on the under side of the drum. The brake-lever L is simultaneously pressed down on the drum and the descent of the weight which has been hoisted is regulated at will. The operation is thus completed, and the drum is again allowed to lock with shaft A. The free end of the rope D may be again attached to some object to be hoisted, and the operation repeated.

Having thus described my invention, I claim as new and desire to secure by Letters Patent—

The combination, with the rotary sweep-shaft A, having arm F, of the adjustable winding-drum C, having studs E, the brake-lever L, the rod H, and lever I, all constructed and arranged to operate as shown and described.

GEORGE W. GORDON.

Witnesses:
 P. CHAPMAN,
 ISAAC MORSTELL.